United States Patent
Fee et al.

(12) 
(10) Patent No.: US 6,516,393 B1
(45) Date of Patent: Feb. 4, 2003

(54) DYNAMIC SERIALIZATION OF MEMORY ACCESS IN A MULTI-PROCESSOR SYSTEM

(75) Inventors: Michael Fee, Cold Spring, NY (US); Pak-kin Mak, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 09/676,185

(22) Filed: Sep. 29, 2000

(51) Int. Cl.[7] .............................................. G06F 12/00
(52) U.S. Cl. ..................................................... 711/150
(58) Field of Search ............................... 711/147, 150, 711/151

(56) References Cited

U.S. PATENT DOCUMENTS

| | | | |
|---|---|---|---|
| 4,493,036 A | 1/1985 | Boudreau et al. | 364/200 |
| 4,627,018 A | 12/1986 | Trost et al. | 364/900 |
| 5,339,442 A | 8/1994 | Lippincott | 395/725 |
| 5,519,837 A | 5/1996 | Tran | |
| 5,761,445 A | 6/1998 | Nguyen | 395/280 |
| 5,832,304 A | * 11/1998 | Bauman et al. | 710/39 |
| 5,875,472 A | * 2/1999 | Bauman et al. | 711/141 |
| 5,941,967 A | 8/1999 | Zulian | |
| 6,073,182 A | 6/2000 | Jones et al. | |

* cited by examiner

Primary Examiner—Kevin Verbrugge
(74) Attorney, Agent, or Firm—Lynn L. Augspurger; Cantor-Colburn LLP (57) ABSTRACT

A method for resolving address contention and prioritization of access to resources within a shared memory system includes dynamically creating ordered lists of requests for each contested resource. A new request is added to the lists only after a conflict is recognized. Since the resource conflict does not always exist, there is no impact to a request for an uncontested resources.

4 Claims, 9 Drawing Sheets

DYNAMIC SERIALIZATION OF MEMORY ACCESS IN A MULTI-PROCESSOR SYSTEM

FIELD OF THE INVENTION

This invention is related to computers and computer systems, and in particular to mechanisms for resolving address contention and prioritization of access to resources within a shared memory system.

BACKGROUND OF THE INVENTION

Multiprocessor systems can take many forms and individual designs may contain many unique features. Common among multiprocessor systems is the requirement to resolve shared address conflicts. Shared address conflicts occur when one or more processors attempt to update shared data. Since resolving this type of conflict necessitates a serialized access, system designers avoid scenarios where this type of activity occurs. For example, a processing unit may be assigned a private address space by the operating system; enabling that processor to work uninhibited by conflicts. Even in this environment, an idle processor will commonly obtain new work from a queue stored in a shared address space. As the speed and number of processors increase, this coordination of workload becomes more critical. Some workloads, however, desire interaction among many processors and efficient resolution of conflicts is required even with relatively slow processors. For example, large databases are maintained for many businesses, these databases can be updated by several applications running simultaneously. Conflict resolution often becomes the limitation of the system. It is desired to have a multiprocessor system that minimizes these shared conflicts, but also minimizes the performance impact when it does occur.

Technological advances have created faster processors while also giving denser, but relatively slower memory. Cache hierarchies, layers of faster but smaller capacity memories, have been added to offset some of this impact and reduce access delay. Since the cache is a subset of the total memory a processor can access, a directory is required to keep track of which blocks of main memory correspond to what blocks are held in the cache. Since all updates to memory must be visible to all processors in a shared memory multiprocessor system, changes to data in the caches must be made available to all processors and devices in this system. A common method in the art has been to add tags to the directories of the caches that indicate the ownership state of each block in the cache (directory-based cache coherence). This ownership state will indicate a processors write authority of the block. If a processor wishes to update a block of data in a cache, it must first obtain exclusive rights via some interprocessor communication. Once it has exclusive authority the processor may change the directory ownership state of the contested block and proceed with its updates. What is important is that interprocessor communication is required to pass ownership of shared blocks between processors. This interprocessor communication can add significant delay to the overall delay associated with accessing data. Access to the interprocessor communication is usually serialized in order to ensure one processor can update the contested block. This usually means that processors must request priority in some manner to use the required resources. A good priority design, one that ensures fair access, is critical to ensure proper work distribution and avoid starvation of requesters. As the number of memory requesters increase, it becomes more difficult to maintain equal access to memory resources and can impede the scalability of the multiprocessor system. A priority system that can reduce the negative impact of the processor interconnect and associated traffic is desired.

Priority designs have been used that enter requests in a centralized queue or similar ordering mechanism to ensure requests are presented in the same order they are received. The queue maintains the order while the memory system completes each request presented by this queuing system. This solution guarantees the order, but requires the order to be set before any resource is evaluated for availability or conflict. An example would be the availability of cache interleaves. With this solution, no request could bypass a request that was stalled due to its target cache interleave being unavailable. This means that the additional latency for that one request is now added latency to all requests queued behind it. Also, the requests in the queue may not have an address conflict with the stalled request and therefore do not benefit from the forced serialization. Additional patches to avoid this queuing effect could be employed at the input of the stack. For example, creating multiple stacks based on an address range would require checking the address before entry into the stack. The effectiveness of this solution would be limited by how much hardware, in the form of physical arrays or other memory device, could be available for this purpose. Also, all improvements of this kind would negatively impact the nominal latency by adding additional checking and categorization of requests before priority. Some other priority schemes use sampling in an attempt to reduce some of the complex interactions that can cause request starvation. The sample, or snapshot, tags the requests outstanding at a given time and ensures that all of these requests are satisfied before a new sample is taken. Since a satisfied request in the current snapshot cannot create a visible request until the snapshot is emptied, some starvation scenarios may be avoided. However, snapshot designs depend on the requests not having dependencies between them which, in some implementations, may not be true and can lead to a deadlock condition: a request in the snapshot waiting for a request not in the snapshot. This class of solution does not attempt to improve access among contentious requests, it just limits the scope of the problem to a scale presumed to be manageable and is therefore likely to add to the nominal latency without a guarantee of success.

A Least Recently Used (LRU) priority algorithm may be used to ensure that all processors have fair access. In order to limit the latency of the priority request, a partial-LRU is used. This partial-LRU uses fewer bits and allows for quicker calculation of priority. In this system, requests are arbitrated and presented to a pipelined structure. The request moves through this pipeline and initiates a cache-access and associated directory lookup, checks resource availability and checks if any other request has the same address locked. If there is no owner, the current requester assumes ownership by setting a lock. This lock remains active until the request has been satisfied. Once a lock is set, all subsequent requests to the same address block their memory access and set a resource-need for the owning requester to complete. This resource-need prevents further pipeline accesses until the owning request completes. The owning request is then free to change the ownership status of the line, if necessary, and return the requested data to the processor. Such a system works well until address activity, as in the interprocessor synchronization of the kind described earlier, occurs. In those cases, many requests are attempting to access the same address. They will all enter the pipeline and set their resource-need for the owning processor, the owning processor will complete and the remaining requests will all vie for priority again, a new owner will set its lock and all subsequent requests will then set a resource-need for the new owner. Each request will busy the pipe, and other resources, only to set its resource-need for the newly designated owner. Once the new owner completes the process starts again. With each completion, the priority mechanism is tested again and resources busied causing increased traffic and latency. In addition, a completed processor may issue another request to the same address before all processors have accessed the data. Since the priority logic has been optimized for best-case, and due to inherent latency with the request generation after a lock is cleared, the new request can beat those waiting. The combination of the partial-LRU rather than full LRU, latency of transferring ownership, the additional traffic and the optimization of new requests can cause lockout scenarios. Prior systems exhibited this type of processor starvation and attempts were made that correct some special case scenarios. Hang avoidance hardware, added to avoid deadlock situations, has also been used to avoid processor initiated recovery.

As more processor requesters are added, traffic and latency are added and an improved arbitration device is necessary.

SUMMARY OF THE INVENTION

Requests made by processors, in a multi-processor system, to the same address space of shared memory, are satisfied in the order that the requests are received. In a computer system that contains a plurality of processors attached to a common memory sub-system, multiple requesters are often contesting for the same address space at the same time. Memory controller resource availability and access thereto can force undesirable ordering among the requests. However, the same complex resource interactions dictate a solution that does not serialize all requests, i.e, requester B should not wait for requester A unless there is a contention between A and B. This invention provides that all requests have equal access to the memory resources unless the requests are attempting to access the same location in memory at the same time. Once this contention has been identified, access to this location is ordered.

As the shared memory controller processes each request, address contention is checked. If there is no current owner designated to access the specified address range, that request is granted ownership of that address space until its request is satisfied. Subsequent requests for the same memory location set their need for the last requester to see the same conflict rather than the first. As each master completes, only one requester resets its need and is processed. There can be any number of these ordered lists and any number of requesters on each list. Heretofore, all subsequent requests for that same address space would see this owner and set a resource need latch for it to complete. Once this address-owner completes, all remaining requests are processed again.

A method of serializing access to an address space without a negative impact to memory access to different address spaces is accomplished by dynamically creating ordered lists of requests for each contested address. A new request is added to the list only after a conflict is recognized. Since the address conflict does not always exist, there is no impact to a request for an uncontested address. Hardware is added that will generate a resource-need corresponding to the last requester that encountered the same address contention as opposed to setting a resource-need for the owning requestor.

Any number of these ordered lists may exist. For example, in a system with twenty requesters, there can be twenty, one requester ordered 'lists', or one, twenty requester ordered-list or any combination in between. There is no physical limitation added by the ordering device. The creation of the lists depends on a certain lock bit. As mentioned earlier, a regular lock is set if no address conflict is recognized and that requester is given ownership. This lock moves and is always held by the last requester in each address differentiated ordered list. New requesters will recognize a conflict against the last requester rather than the first and set its resource-need accordingly. In this way the first requester is free to update the status of the cache block unencumbered by all other contestants and the list ensures fair, orderly access, to memory. At any time, a processor in the ordered list may be forced into recovery and temporarily taken out of the system. Care must be taken to ensure that this does not cause a deadlock condition. Other cases occur with setting and resetting the moving lock, especially in a pipelined environment where contention can occur each cycle for many cycles.

Other contested resources may also be included. For example, if multiple cache-block spill/fill resources are available, these limited resources may become contested. The same resolution can occur. Several processor requests may miss the cache and attempt to load the cache-spill/fill resource only to find that there are none available. This requester will set its resource-need for the next one to become available. Once this happens, it will make another pipeline pass to load the resource only to find that a requester one cycle ahead in the pipeline takes the last one. In this case ordered lists can be created for the spill/fill resource in the same manner as the address contention. The same benefits are also realized. For example, only requests that actually need the spill/fill resource are forced into the list, and only when the resource is unavailable.

DETAILED DESCRIPTION OF THE INVENTION

In this environment, typically, in the arena in which the invention operates, a plurality of central processors (CP) act as requesters, for example, a CPA, CPB, CPC and CPD, each generate a FETCH request to a storage controller (SC) for the same address in shared memory. The Command and Address for each request are sent to the SC. No new requests are sent while these four requests are being processed. The SC receives these requests and ingates each into its own fetch controller. One request is chosen by priority to enter the pipeline and is in the first cycle (C1). During the second cycle (C2), the address associated with CPA is compared against all 'pending' requesters. The C2 Pipeline Address is distributed to all requesters. Each requester performs a COMPARE against their address. If the address matches and that requester's pending latch is active, a COMPARE signal is sent. The request in C2 sees a COMPARE against another requester. Only one request can have its pending latch set for a given address. All of the COMPARE lines are brought together and a COMPARE IDENTIFIER is generated. This identifies the pending requester with the same address as that in C2 of the pipeline. No other request is pending in the SC when CPA moves through the pipeline (there are three other valid requests). CPA does not see a COMPARE in its C2 pipeline cycle and does not set its need register for address compare. Also available in C2 are the directory results. This indicates whether or not the sought after data is available in the cache and whether the ownership state is okay for the FETCH request type. If the data is not in the cache, spill/fill controls are loaded and CPA sets its need register for data from main memory. If the ownership state indicates that an exclusive INVALIDATE must be sent to another processor, the INVALIDATE is sent (exclusive intervention) and CPA sets its need register for a response from the target processor. If the data is available and already in the proper ownership state the data is returned. In the C2 cycle, CPA sets its pending latch so that other requests, valid in the SC, will see a COMPARE against CPA while CPA is obtaining its data.

Following CPA, is CPB, CPC and CPD. When CPA is in C2, CPB is in C1. When CPA is in C3, CPB is in C2 and CPC is in C1. When CPA is in C4, CPB is in C3, CPC is in C2 and CPD is in C1. This is the pipeline concept. When CPB is in its C2 cycle it will see a COMPARE against CPA which now has its pending latch on and so CPB sets its need register for CPA. When CPC is in C2 it sets its need register for CPA. When CPD is in C2 it sets its need register for CPA.

CPA eventually gets its data and its requester completes resetting its valid latch and pending latch. All requesters with their need registers set for CPA see CPA's valid latch drop and vie for priority again. In this example CPB, CPC and CPD present a request to the priority mechanism (i.e., the second request for CPB, CPC and CPD).

Assuming the priority order is the same CPB will get the GRANT, move through the pipeline, and not see any address COMPARE in C2. C2 will set its pending latch and complete the FETCH operation.

CPC will follow CPB and when it is in C2, it will see a COMPARE against CPB and set its need register for CPB. CPD will follow CPC and when it is in C2, it will see a compare against CPB and set its need register for CPB. When CPB completes, CPC and CPD will reset their need registers for CPB and vie for priority again (i.e., the third time for CPC and CPD). Assuming the priority order is the same, CPC will get into the pipeline and, when it is in C2, will not see any COMPARES and will set its pending register. CPD will follow CPC and will see a COMPARE against CPC and set its need register for CPC. When CPC completes, CPD will reset its need register and will request priority (i.e., for the fourth time). When CPD gets to C2 it will not see any COMPARES and will complete its operation.

Turning to the environment of the invention generally, in a shared memory multiprocessor system a number of processors, I/O modules and other system clusters are attached to a shared memory controller. This controller provides access to a shared, interleaved cache. It handles the coherency management associated with the cache, and provides access to an interleaved main memory. To ease management of resources and leverage the interleaved nature of memory, a pipelined structure is used where during each clock cycle, a new memory access can be initiated. In the invention described, the storage controller provides a priority mechanism for entrance into this pipeline which is included to ensure fair and equal access for the various requesters and prevent starvation of any request. The invention also includes a process which has the ability to resolve an address contention that results from multiple requesters attempting to update the same address location simultaneously.

By way of a general example four processors (a P0, P1, P2 and P3) attempting to access a common address, present their requests to the shared memory controller simultaneously. The four processors enter the pipeline in their named order: P0, P1, P2 and then P3. When P0 enters the pipe it will set its lock since it will not encounter any address contention. P1 will see P0, as was the case in the prior-art, set a resource-need for P0. P2 will enter the pipeline and instead of setting its resource-need for P0, it will instead, set it for P1. In the same manner, P3 will set its need for P2. When processor P0 completes, only P1 will make a request to priority: P2 and P3 will have a resource need for P1 and P2 respectively. Likewise, when P1 completes P2 will make a priority request and P3 will wait. If P0 comes back with a second request for the same address, before P3 has completed, P0 will set its resource need for P3. However, if P0 is requesting a different address, it can complete unimpeded by the existing ordered list.

The overall system structure of the preferred embodiment will now be discussed with particular detail illustrated in the Figures, as set forth below.

Figure 1:
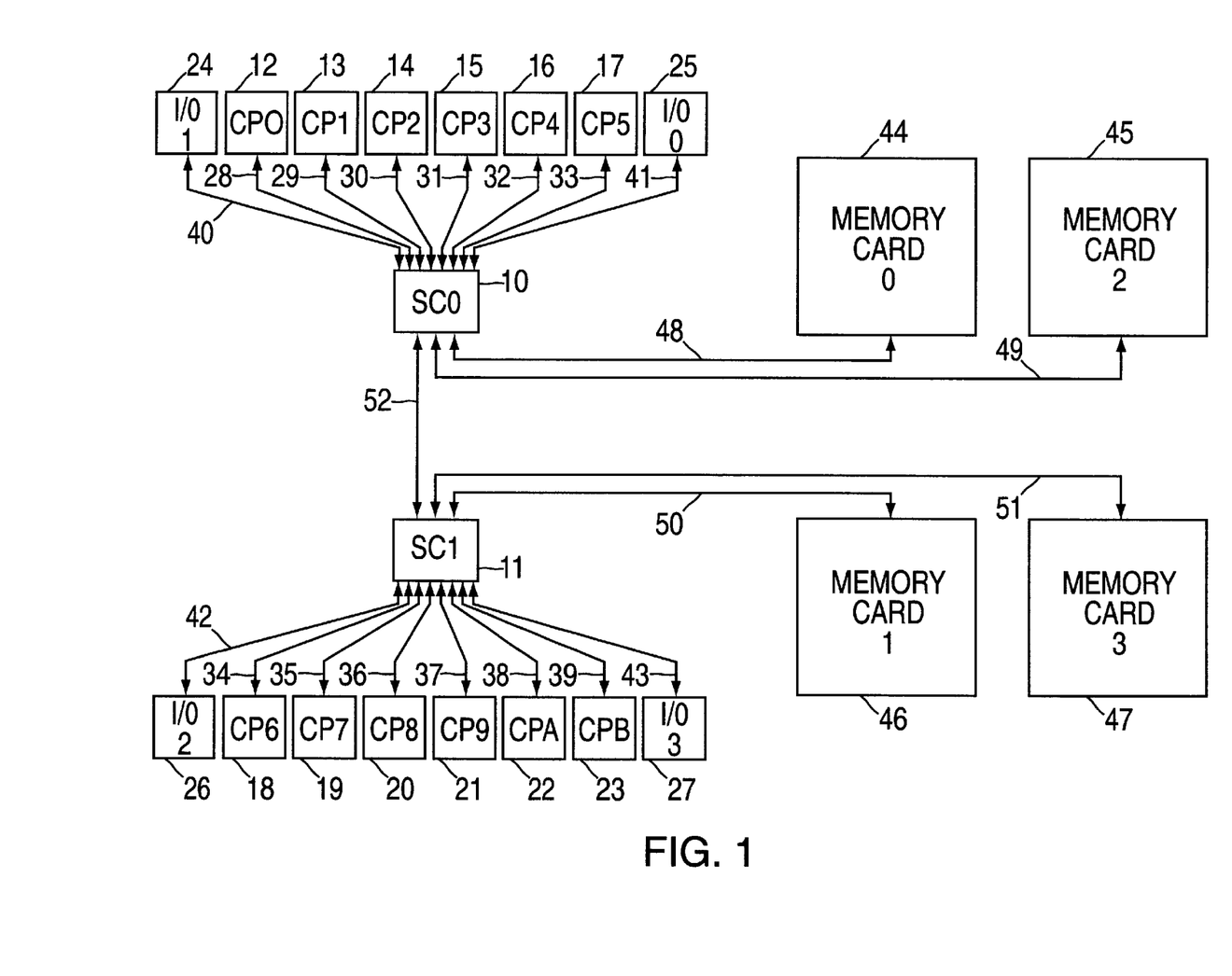
FIG. 1 is a system overview of the multiprocessor system of the preferred embodiment.

FIG. 1 shows an overview of the multiprocessor system which is the preferred embodiment of the present invention. In a fully configured system, a maximum of twelve CP's (12, 13, 14, 15, 16, 17, 18, 19, 20, 21, 22, 23) four I/O adapters (24, 25, 26, 27), and four memory cards (44, 45, 46, 47) may be connected to two storage controllers (SC 10 and SC 11). It is possible to have a one-node system containing only one SC. Such a system supports a maximum of six CP's, two I/O adapters, and two memory cards. Each CP contains a store—through level 1 (L1) cache, while each SC contains a store in level 2 (L2) cache.

A CP or I/O adapter connects directly to only one SC. A given SC has direct access to two of the memory cards, SC0 (10) to memory card 0 (44) via one bus (48) and to memory card 2 (45) via a separate bus (49). Similarly, SC1 (11) has access to memory card 1 (46) by means of one bus (50), and to memory card 3 (47) using a separate bus (51).

However, all CP's and I/O adapters have access to any portion of the main memory. Storage access to the other two memory cards is handled by an SC to SC operation (52), which is transparent to the CP or I/O adapter. Each CP or I/O adapter has two data buses to the attached SC, referred to as data bus A and data bus B. Storage data from memory cards 0 and 1 (44, 46) is returned on bus A, while data from memory cards 2 and 3. (45, 47) is returned on bus B.

All request to the storage controller SC are initiated by sending an address and command to the SC from a CP, I/O adapter, or other (remote) SC. When the SC has completed the request, a response, and possibly data, are sent back to the originator of the request.

Fetch and store requests from a CP to its attached SC utilize a group of unidirectional and bidirectional buses (28, 29, 30, 31, 32, 33, 34, 35, 36, 37, 38, 39) to the transmit commands, addresses, data, and responses. CP fetch and store requests are sent via a unidirectional bus for the address and command portions of the request, and two bidirectional buses for sending the data portion. The data portion of the request may be store data sent from the CP to the SC, or fetch data sent from the SC to the CP. These bidirectional buses are the data bus A and data bus B referred to previously. They are each one quadword wide. There is also a unidirectional bus from the SC to each CP used to send responses, indicating when a fetch or store request has completed and what all the status of the request was, for example, normal completion, or invalid address.

The I/O adapter interface is also made up of bidirectional and unidirectional buses (40, 41, 42, 43). In this case, commands addresses, and responses are sent between the SC and the I/O adapters via a bidirectional bus. Fetch and store data is sent on two bidirectional buses, data bus A and data bus B, each a doubleword wide. Unidirectional buses are used for other controls signals.

The remote SC interface uses unidirectional buses for commands, addresses, responses, and data (52). Thus, there are two sets of these buses in a fully configured system, one from SC0 to SC1, and one from SC1 to SC0. Data is transmitted on four quadword-wide unidirectional buses; bus A and bus B from SC0 to SC1, and bus A and bus B from SC1 to SC0. In the case of the one-node system described above, there is no remote SC, and therefore there are no requests originating from the remote SC.

Figure 2:
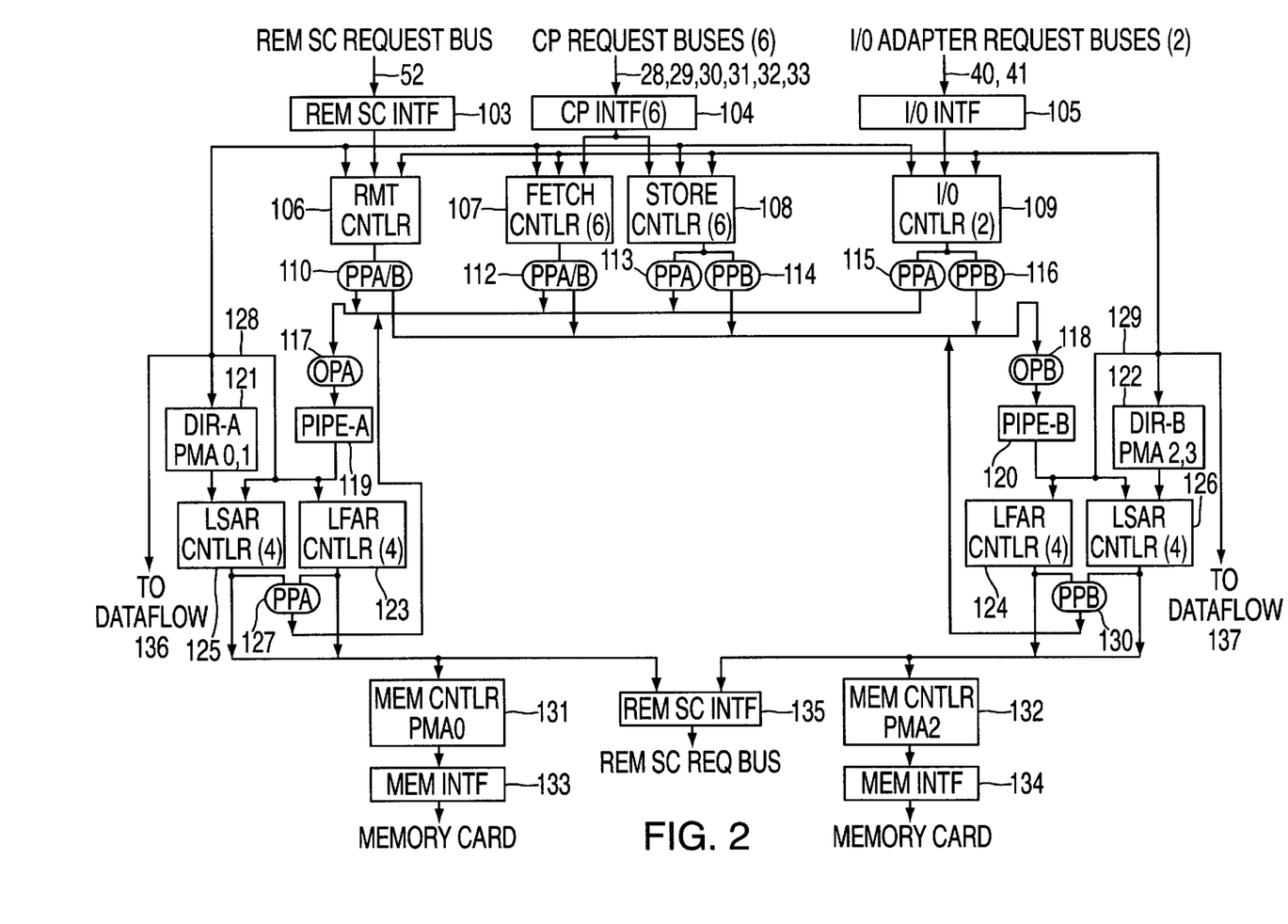
FIG. 2 is a diagram of the address flow for a single storage controller in the multiprocessor system of FIG. 1.

For a more detailed understanding of the high-level address flow reference will be made to FIG. 2 which shows the high-level address flow for one of the storage controllers (SC0) shown in FIG. 1. There are two separate pipelines, referred to as pipeline A (119) and pipeline B (120), each with its own directory (121, 122), and each with an interface to one memory card (133, 134) via memory controller logic (131, 132). The two processing pipelines in the SC correspond to the two data buses mentioned previously. Pipeline A handles requests for storage on bus A (memory card 0) while pipeline B handles requests for storage on bus B (memory card 2). The pipeline information is forwarded to the dataflow logic (136, 137), where it is used to access the L2 cache. It is possible to have a system with only one pipeline per SC. In this case, the SC has access to only one memory card.

The directory associated with a given pipeline is accessed on the first cycle of an operation's pipeline pass. If there is a directory hit, data is returned from the L2 cache. If there is a directory miss, further processing of the request is handled by the line fetch address register (LFAR) LOGIC (123, 124). The address and control information for the request will be gated into one of four LFAR registers available for each pipeline. A request is sent to the remote SC via the remote SC interface register (135). The cache in the remote SC is interrogated, and the data will be sent from the remote SC to the attached (local) SC, and from there to the requesting CP or (I/O adapter. If there is a miss in the remote SC cache, the request will be sent to one of the memory cards attached to the local SC, or to one of the memory cards attached to the remote SC depending on the target address.

If a cache entry must be castout to make room for a new entry the L2 cache, it is handled by the line store address register (LSAR) logic (125, 126). The address targeted for replacement using an LRU algorithm is gated into one of the four LSAR registers available for each pipeline. The LSAR logic controls storing the data to main memory and invalidating the entry in the cache.

Requests originating external to the SC, which may be either fetches or stores, are received via the remote SC interface (52), this six CP interfaces (28, 29, 30, 31, 32, 33), and the two I/O adapter interfaces (40, 41). In each case, an interface register (103, 104, 105) is used to latch the information for a request for one cycle. After that, it is sent to the associated controller.

Each functional area within the SC has a separate controller, which handles input from the interface, priority requests, and control of the request as it passes through the pipeline. There are two I/O adapter controllers (109), six CP fetch controllers (107), six CP store controllers (108), and one remote SC controller (106). Within each controller, there are holding registers to keep track of the information associated with a given request. These registers will remain valid until the request is completed by the SC. In most cases, some decoding of the request must be done to direct it to the correct holding register.

Within the remote SC controller (106), separate registers are used for fetch and store requests from the remote SC, with two registers per pipeline dedicated to holding fetches and two dedicated to holding stores. The interface information includes a pipeline select, which chooses one group of four registers, and the command is decoded to determine whether it is a fetch or store, to select the pair of fetch or store registers.

A single interface register is used for CP fetch and store requests for each CP (104). The incoming command must be decoded to determine whether it is a fetch or store. Requests are staged from this interface register to the associated CP fetch controller (107), which contains one fetch request register, or CP store controller (108), which contains two eight-entry stacks, one for each pipeline, containing addresses and control bits for store requests.

Commands sent from the I/O adapters may also be fetches or stores. The I/O controller (109) has two request registers per I/O processor per pipeline, for a total of four registers per pipeline, each of which may hold a fetch or store. The I/O adapter keeps track of which registers are available within the I/O controller, and it indicates the destination register when the command is sent.

Within each controller, the signals indicating a valid request, in addition to other control information, are used to determine whether the request is eligible for priority in a given cycle. All eligible requests in a given category are sent to the associated pre-priority logic station.

For remote SC requests, there is a single pre-priority station (110) for both pipelines. A single request is chosen for pre-priority for either pipeline A or pipeline B. A request in the interface register is able to get immediate priority, and has the highest priority. If there is no request in the interface register, the pre-priority logic arbitrates among the four registers for each pipeline using a psuedo-LRU algorithm (request which completed most recently has lowest priority). Priority is alternated between the two pipelines.

There is a single pre-priority station for CP fetches (112) for both pipelines also. A psuedo-LRU algorithm is used to choose one out of many as six eligible requests. This arbitration is done without regard to the destination pipeline of the CP fetch request.

CP stores must be processed in the order they are received. The stacks which are used to buffer store requests are managed in FIFO order. Only the oldest store for each pipeline from a given CP is eligible for priority. There are two separate pre-priority stations for CP stores, one per pipeline (113, 114), therefore it is possible for two different stores to be granted pre-priority in one cycle. The pre-priority stations for CP stores employ a modified round-robin algorithm for each pipeline to choose one store out of as many as six eligible requests.

The I/O controller also has separate pre-priority stations for pipelines A and B (115, 116). A psuedo-LRU algorithm is used to determine the pre-priority among the four possible requests for each pipeline, without regard to whether they are fetch or store operations.

There is a shared pre-priority mechanism for LFAR's and LSAR's (127, 130). If there are multiple LFAR requests, they are chosen in order—LFAR 0 first, then LFAR 1,2 and 3. Similarly, if there are multiple LSAR requests, they are chosen in order starting with LSAR 0, then LSAR 1, 2 and 3. A toggle latch alternates priority between LFAR and LSAR.

The overall priority arbitration logic for a pipeline (117, 118) selects one request, using a ranked priority order. The order has been determined based on frequency of requests, with the least frequent requests having highest priority, and the most frequent requests having lowest priority. The priority order, from highest to lowest, is: remote SC requests, LFAR/LSAR requests, I/O adapter requests, CP fetch requests, and CP store requests. Address and control information for the selected request is sent to the first stage of the pipeline.

Each controller receives inputs from both pipelines (128, 129), and tracks the progress of its requests through the pipeline, monitoring input signals which are valid in specific pipeline cycles. Some of theses signals are used to determine whether the request is in a certain stage of the pipeline. Examples of other pipeline inputs are directory hit results and compares against other address registers. These inputs are used to decide whether all the resources needed for the request are available, or if its processing must be interrupted to wait for some condition to be satisfied. When the processing of a request is interrupted, signals are sent to the pipeline logic. Controls are reset so that this request no longer appears as a valid entry in later stages of the pipeline. Signals are also sent to various logic stations within the controller. Actions taken within the controller include resetting control bits which indicate that the request is currently executing.

Figure 4:
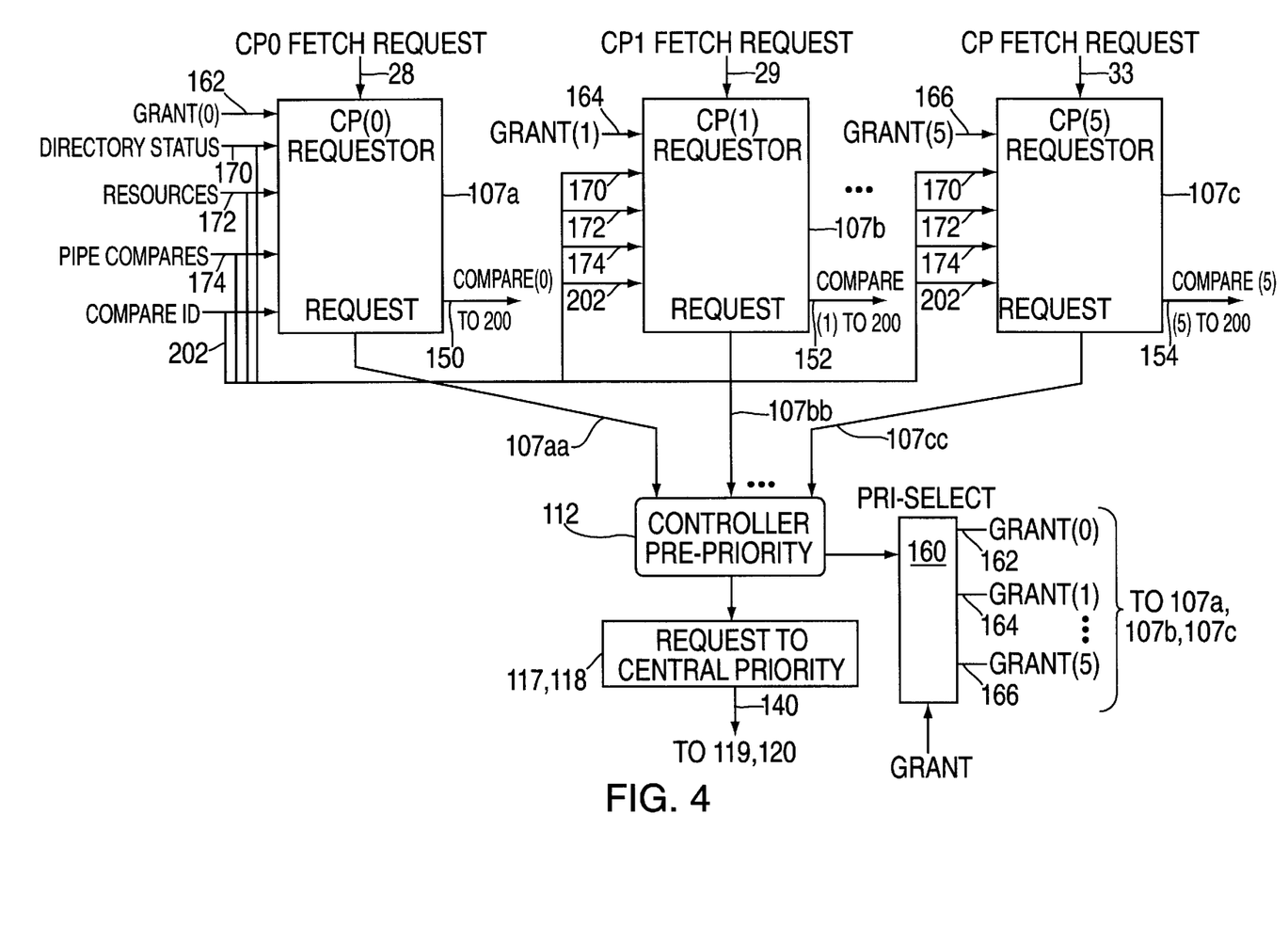
FIG. 4 is a diagram of a plurality of central processor fetch controllers making requests to the central processor fetch pre-priority station.
Figure 5:
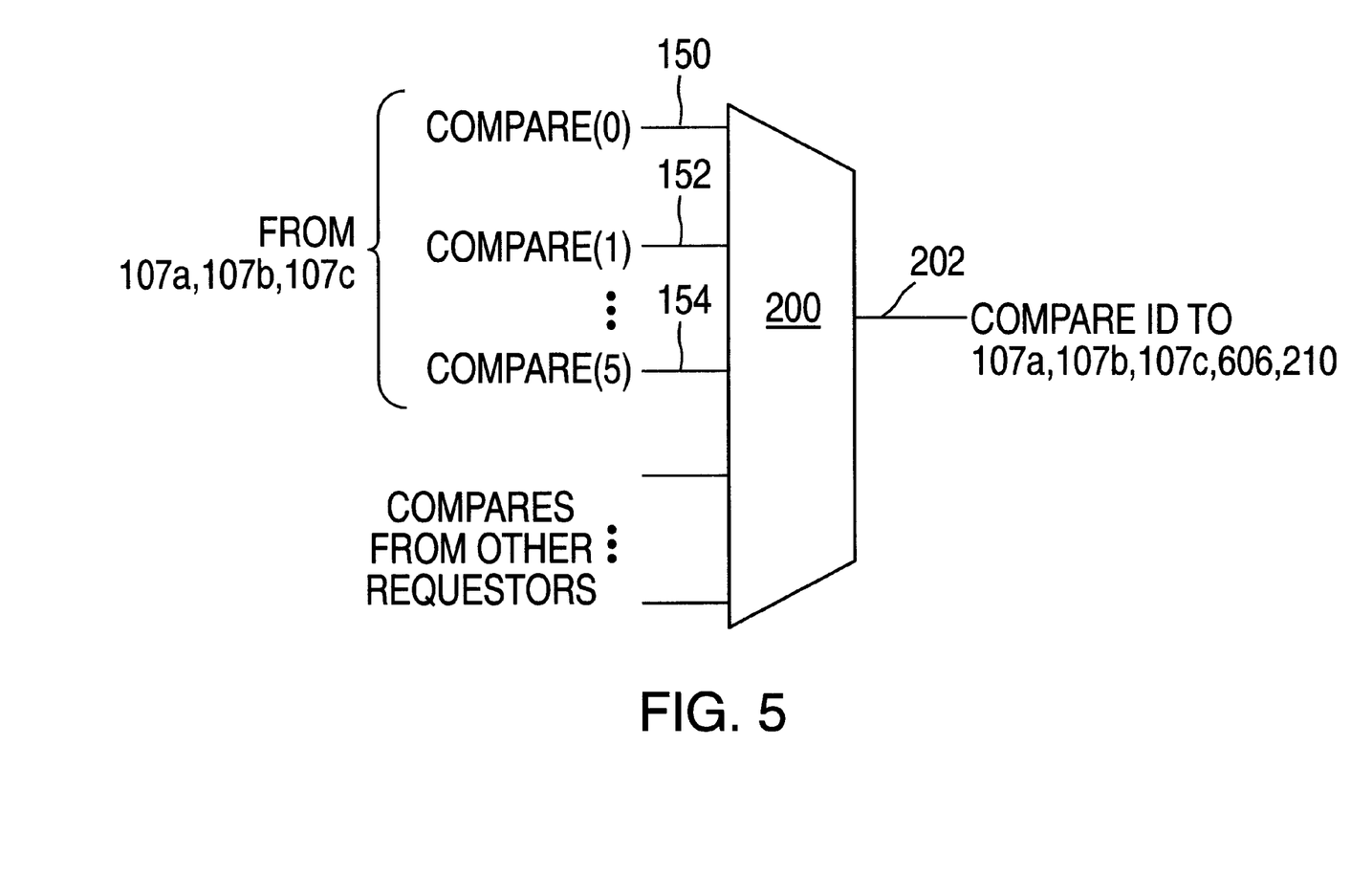
FIG. 5 is a diagram of an encoder creating a compare identifier corresponding to the pipeline identifier for the requester.

Referring to FIG. 4, a plurality of central processors (not shown) generate FETCH requests to the storage controller (10) for the same address. The storage controller (10) receives these requests and ingates each request into a fetch controller (107a, 107b, 107c) dedicated to a specific processor, i.e., there is one fetch controller per central processor. Only three fetch controllers (107a, 107b, 107c), receiving fetch requests (28, 29, 33) from respective central processors, are shown in FIG. 4, but are to be considered representative of a plurality of fetch controllers in communication with the central processors. For example, four central processors, CP1, CP2, CP3 and CP4, may generate FETCH requests. The Command and Address for each request is sent to the storage controller (10). All requests are received at once and no new requests are sent while these four requests are being processed. One request (140) is chosen by a Controller Pre-Priority Station (112) and the Central Priority (117, 118) to enter either of pipeline A (119) or pipeline B (120). The request so chosen is in the first cycle (C1).

Figures 6, 6A:
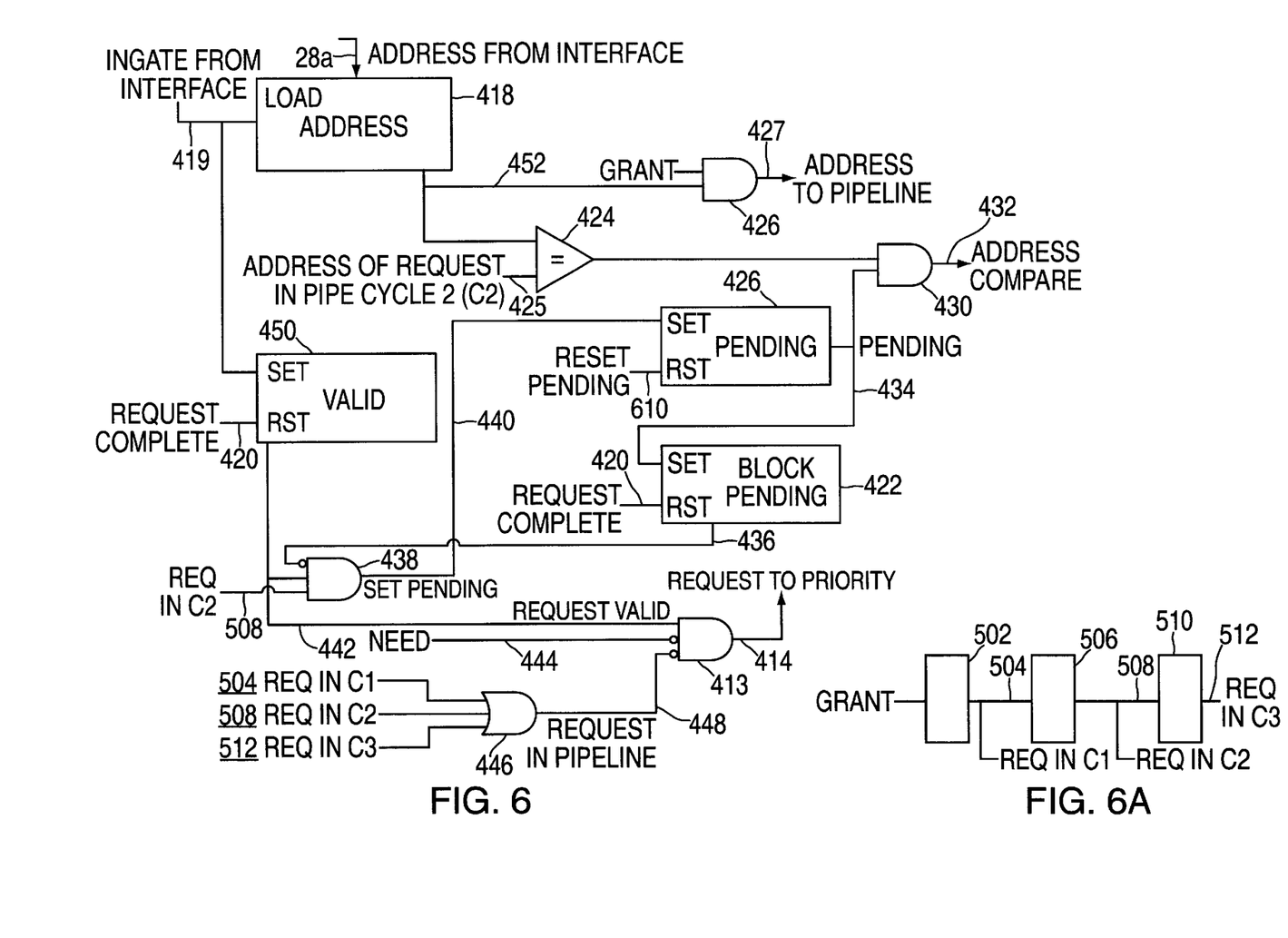
FIG. 6 is a diagram of the Address held by the fetch controller and the manner in which the fetch controller provides the Address Compare.
FIG. 6A is a diagram of a pipeline monitor.
Figure 7:
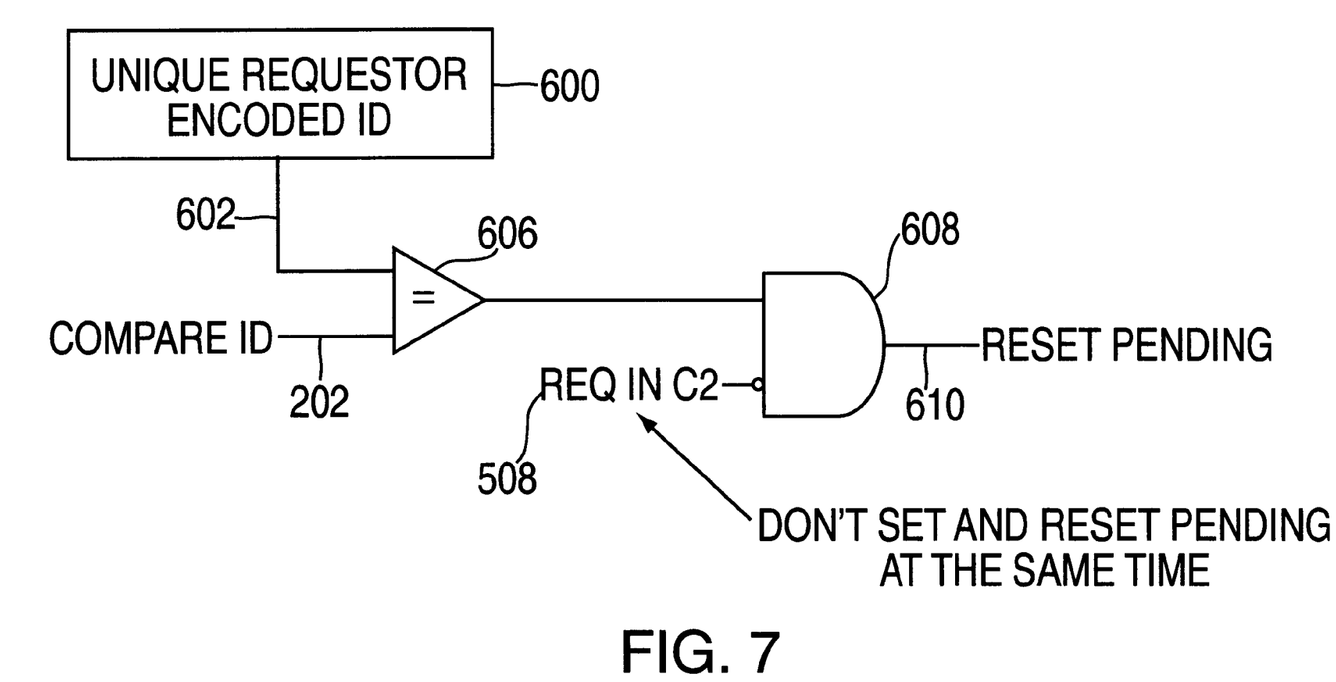
FIG. 7 is a diagram of the generation of the Reset Pending.
Figure 8:
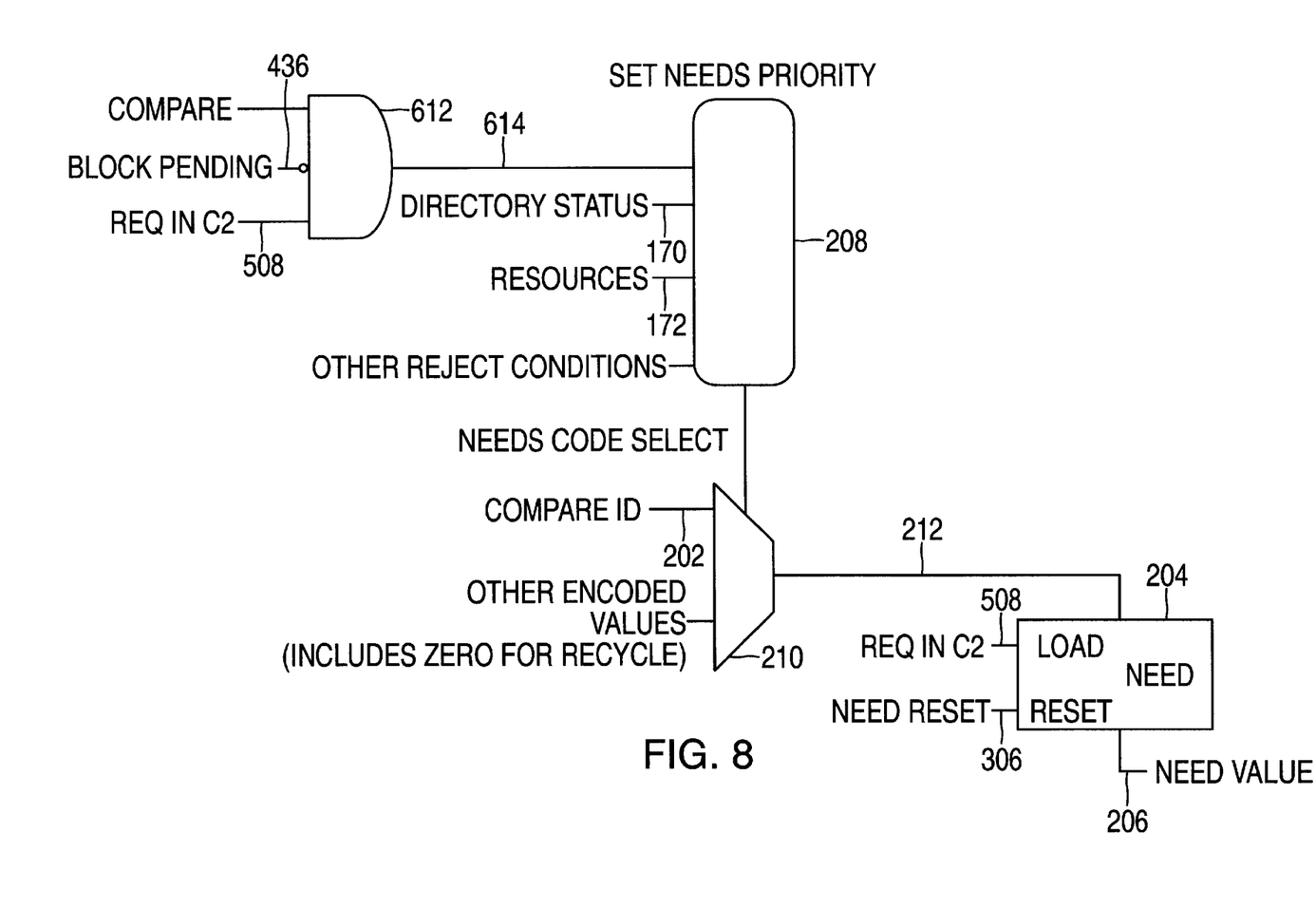
FIG. 8 is a diagram of the set of the need register.
Figure 9:
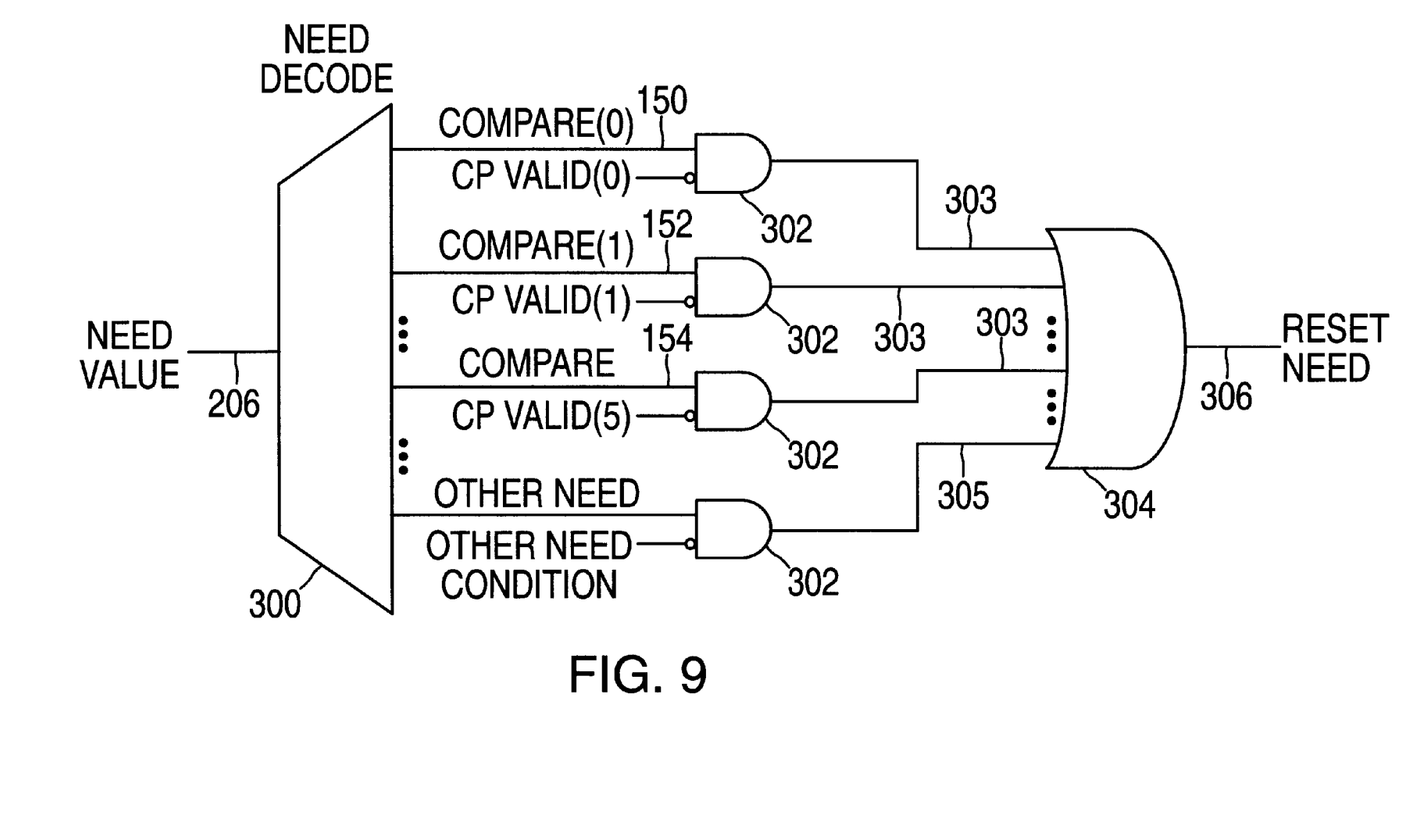
FIG. 9 is a diagram of the decode of the Need and the Reset conditions.

As shown in FIG. 6, during the second pipe cycle (C2), the address associated with CP1 is compared at (424) against all 'pending' requesters. The C2 pipeline address (425) input is distributed to all requesters so each requester performs a COMPARE against their address at (424) in FIG. 6. If the address matches and that requester's pending latch (426) is active, a COMPARE signal (432) is output. The request in C2 sees a COMPARE against another requester. Only one request can have its pending latch (426) set for a given address. All of the COMPARE address lines (150, 152, 154) are brought together at 200 in FIG. 4 and a COMPARE IDENTIFIER (202) is generated that corresponds to the pipeline identifier for the requester. This identifies the pending requester with the same address as the requester in C2 of the pipeline. No other request is pending in the storage controller when CP1 moves through the pipeline (there are three other valid requests). CP1 does not see a COMPARE in its C2 pipeline cycle and does not set its need register (204) (FIG. 8) for address compare When an address compare is encountered in C2 of a request's pipeline pass, the need register (204) will be loaded with a value equal to the Unique Identifier for that requester.

Figure 3:
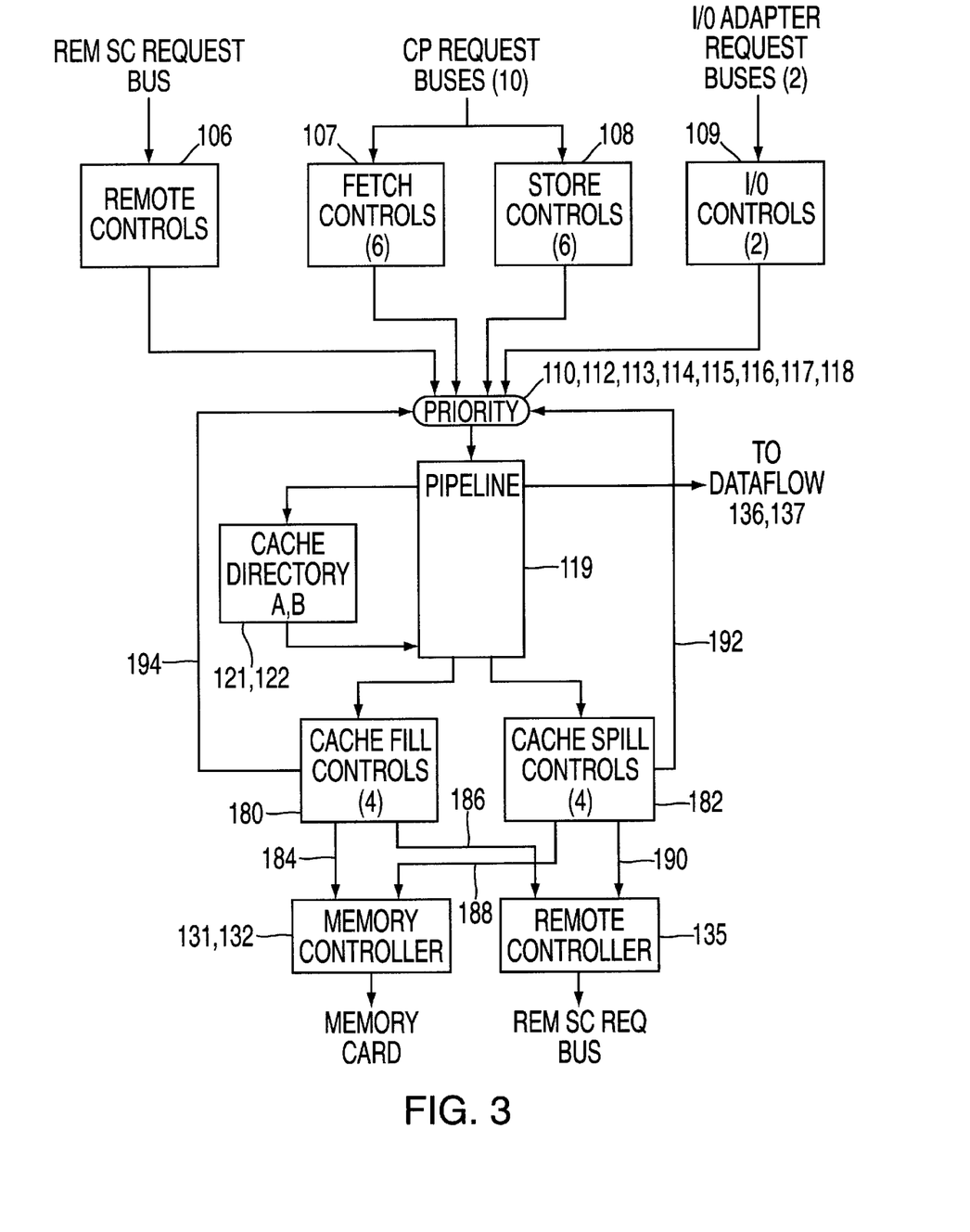
FIG. 3 is a generalized schematic diagram of the system overview of the multiprocessor system of the preferred.

Also available in C2 are the directory results (170) (FIG. 4). This will indicate if the sought after data is available in the cache directory (121) and if the ownership state is okay for the fetch request type. If the data is not in the cache (121), cache spill (182) and cache fill (180) controls (FIG. 3) are loaded and CP1 sets its need register (204) for data from main memory. If the ownership state indicates that an exclusive invalidate must be sent to another processor, the invalidate is sent (exclusive intervention) and CP1 sets its need register (204) for a response from the target processor. If the data is available and already in the proper ownership state, the data is returned. In the C2 cycle, CP1 sets its pending latch (426) so that other requests, valid in the storage controller, will see a COMPARE against CP1 while CP1 is obtaining its data.

Following CP1, is CP2, CP3 and CP4. When CP1 is in cycle C2, CP2 is in cycle Cl. When CP1 is in cycle C3, CP2 is in cycle C2 and CP3 is in cycle Cl. When CP1 is in cycle C4, CP2 is in cycle C3, CP3 is in cycle C2 and CP4 is in cycle C1. When CP2 is in its C2 cycle it will see a COMPARE against CP1 which now has its pending latch ON. C2 will set its need register (204) for CP1. CP2 sets its pending latch (426) and CP1, who sees that CP2 is comparing against CP1, resets its pending latch (426). CP1, which is in its C3 cycle, sets its block pending latch (422). When CP3 is in cycle C2, CP3 sets its pending latch (426) and CP2 resets its pending latch (426). CP3 sets its need register (204) for CP2. CP2 sets its block pending latch (422).

When CP4 is in cycle C2, CP4 sets its pending latch (426) and CP3 resets its pending latch. CP4 sets its need register (204) for CP3. CP3 sets its block pending latch (422). At this point, an address based queue exists with CP1 as the lead, followed by CP2 (need register set for CP1), CP3 (need register set for CP2) and CP4 (need register set for CP3). When CP4 is in cycle C3, it sets its block pending latch (422).

CP1 eventually receives its data and its requester in the SC completes resetting its valid latch (450). CP2 has its need register (204) set for CP1 and resets its need register (204) allowing CP2 to make a new request to the pipeline (119,

120). Once the need register has been reset, the requester will be free to request pipeline priority and complete its operation. No other request, that has its need register set will make a pipeline request. They are prevented because they have need registers (204) set.

When CP2 is in C2 it will see a COMPARE against CP4, but will not set its need register (204) for CP4 nor set its pending latch (426) because it set its block pending latch (422) on its first pass through the pipeline and that latch is still set. CP2 will eventually complete, after the ownership conflict with CP1 is resolved; and CP2 makes a subsequent pipeline pass to access the data, update the directory, reset its valid latch (450) and its block pending latch (422).

CP3 will see CP2's valid latch drop and reset its need register (204) for CP2. It will make a request to priority 112 and when in its C2, will see a COMPARE against CP4. CP3 will ignore this COMPARE because its block pending latch (426) is set. CP3 will resolve its ownership conflict with CP2 and complete resetting its valid latch (450) and block pending latch (422).

CP4 will see CP3's valid latch (450) drop and will reset its need register (204) for CP3. CP4 will make a request to priority and when CP3 is in cycle C2, will see a COMPARE against CP4. CP4 will ignore this COMPARE because CP4's block pending latch (426) is set. CP4 will resolve its ownership conflict with CP3 and complete, resetting its valid latch, (450) and block pending latch (422). In the prior art CP4 makes four passes whereas now CP4 makes two passes.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for resolving address contention and prioritization of access to resources within a shared memory system having a plurality of processors attached to a common memory sub-system having a shared memory controller which processes memory requests and enabling multiple processors to act as requesters contesting for the same address space in said memory sub-system, comprising the steps of:

enabling multiple requesters to proceed with equal access to the sub-system memory without waiting for any other requesters for the sub-system memory, processing requests for memory by said shared memory controller and allowing equal access to the sub-system memory for each request until an access is requested to the same location in memory by more than one contending requestor, and once one requester is identified as requesting access to the same location in memory as another contending requester, said shared memory controller orders the access to the same location by establishing an ordered list of access requests for the same memory location, but when a requester is requesting a different address, the shared memory controller permits the requester to complete its request unimpeded by the existing ordered list.

2. The method of claim 1, further including when an additional requester requests access to the same shared memory address as that for the existing ordered list for that same shared memory address, the request is added to the existing ordered list for that same shared memory address, and the requests are processed by hardware which will generate a resource-need corresponding to the last requester that encountered the same address contention.

3. The method of claim 1 wherein subsequent requests for the same memory location set their need for the last requester to see the same conflict rather than the first requestor of the ordered list, as one of the requestors on the ordered list completes only one requestor of the ordered list resets its need and is processed.

4. The method of claim 1 including dynamically creating ordered lists of requests for each contested resource and adding a new request to the ordered lists of contention only after a conflict is recognized as contending for a new and different address.

* * * * *